United States Patent [19]
Niedrach et al.

[11] 3,926,766
[45] Dec. 16, 1975

[54] MINIATURE PROBE CONTAINING MULTIFUNCTIONAL ELECTROCHEMICAL SENSING ELECTRODES

[75] Inventors: Leonard W. Niedrach; William H. Stoddard, Jr., both of Schenectady, N.Y.

[73] Assignee: General Electric Company, Schenectady, N.Y.

[22] Filed: Nov. 1, 1974

[21] Appl. No.: 519,795

[52] U.S. Cl............ 204/195 P; 128/2 E; 204/195 R
[51] Int. Cl.²................... G01N 27/30; G01N 27/46
[58] Field of Search......... 204/195 R, 195 P, 195 F; 128/2 E, 2.1 E; 324/29

[56] References Cited
UNITED STATES PATENTS

| | | | |
|---|---|---|---|
| 3,703,457 | 11/1972 | Niedrach et al. | 204/195 P |
| 3,705,088 | 12/1972 | Niedrach et al. | 204/195 P |
| 3,709,810 | 1/1973 | Grubb et al. | 204/195 R |
| 3,709,812 | 1/1973 | Niedrach et al. | 204/195 P |
| 3,714,015 | 1/1973 | Niedrach | 204/195 P |
| 3,719,576 | 3/1973 | Macur | 204/195 P |
| 3,726,777 | 4/1973 | Macur | 204/195 R |
| 3,730,868 | 5/1973 | Niedrach | 204/195 P |
| 3,794,575 | 2/1974 | Niedrach et al. | 204/195 P |
| 3,835,013 | 9/1974 | Grubb et al. | 204/195 R |
| 3,839,178 | 10/1974 | Macur | 204/195 P |

*Primary Examiner*—G. L. Kaplan
*Attorney, Agent, or Firm*—Charles T. Watts; Joseph T. Cohen; Jerome C. Squillaro

[57] ABSTRACT

A miniature probe contains multifunctional electrochemical electrodes which measure the hydrogen ion activity or pH of samples. One of these electrodes is contained within a carbon dioxide sensor while the other electrode can be coupled with a separate reference electrode, which may, if desired, surround the probe thereby providing a hydrogen ion activity or pH sensor. In this manner, the miniature probe contains a carbon dioxide sensor and a pH electrode, or a carbon dioxide sensor and a pH sensor.

8 Claims, 1 Drawing Figure

U.S. Patent  Dec. 16, 1975  3,926,766
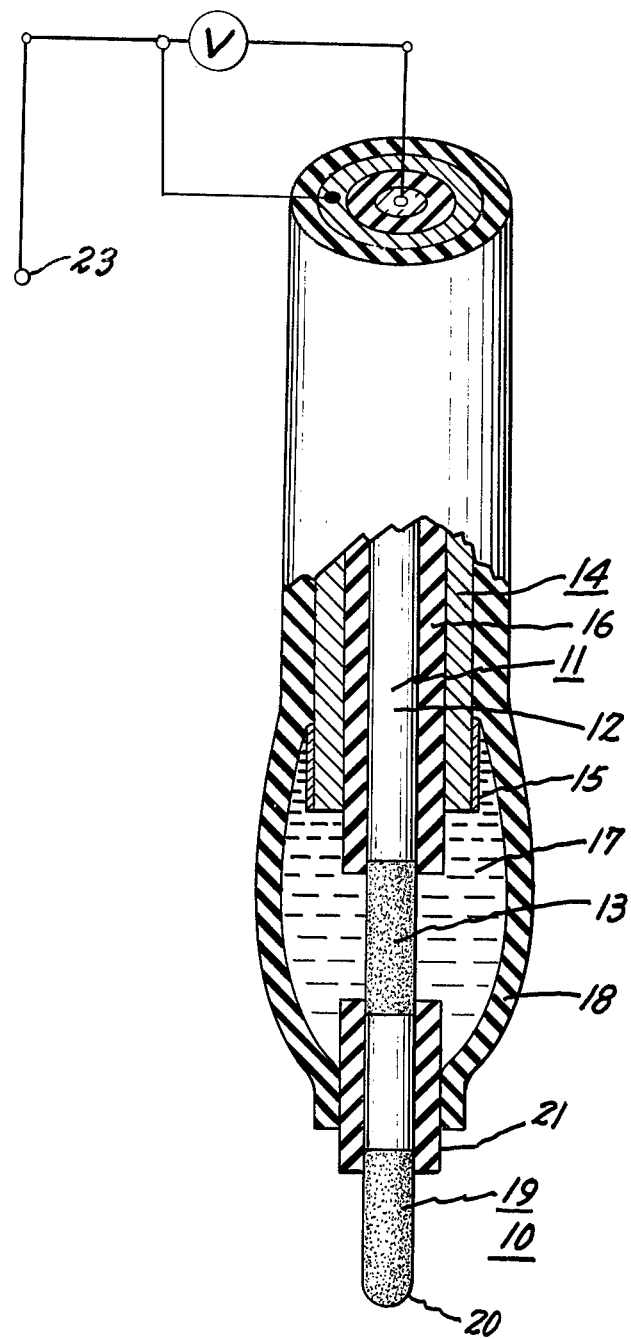

MINIATURE PROBE CONTAINING MULTIFUNCTIONAL ELECTROCHEMICAL SENSING ELECTRODES

This invention relates to a miniature probe containing multifunctional electrochemical sensing electrodes and, more particularly, to such a miniature probe containing a carbon dioxide sensor and a pH electrode, or containing a carbon dioxide sensor and a pH sensor.

Cross-references are made to the following patent applications: Ser. No. 519,273 filed concurrently herewith which application is entitled "Miniature Probe Having Multifunctional Electrodes for Sensing Ions and Gases" in the name of Robert A. Macur; Ser. No. 519,797 filed concurrently herewith which application is entitled "Miniature Probe Containing Multifunctional Electrochemical Sensing Electrodes" in the names of Leonard W. Niedrach and William H. Stoddard, Jr.; Ser. No. 519,794 filed concurrently herewith which application is entitled "Miniature Probe Containing Multifunctional Electrochemical Sensing Electrodes" in the names of Leonard W. Niedrach and William H. Stoddard, Jr.; Ser. No. 519,796 filed concurrently herewith which application is entitled "Miniature Probe Containing Multifunctional Electrochemical Electrodes" in the name of John F. Brown, Jr.; and Ser. No. 519,798 filed concurrently herewith which application is entitled "Miniature Multifunctional Electrochemical Sensor For Simultaneous Carbon Dioxide and pH Measurements" in the names of Oliver H. LeBlanc, Jr., Willard T. Grubb, and Robert A. Macur.

The above five cross-referenced patent applications are assigned to the same assignee as the present application.

Sensors are employed to determine the content of a specific substance in a fluid or atmosphere. For example, a sensor might be employed to determine the content of carbon dioxide in a sample, or its content of hydrogen ions or other ions in solution.

Both pH and carbon dioxide sensors are known, respectively, in the prior art for measuring the hydrogen ion activity or pH of a sample, or for measuring the carbon dioxide content of a sample. A hydrogen ion or pH sensor is described and claimed in U.S. Pat. Nos. 3,671,414, 3,709,810 and 3,719,576. Carbon dioxide sensors are described in U.S. Pat. Nos. 3,673,069, 3,705,088, 3,709,812 and 3,719,576. Methods of manufacturing sensors by successive layers are described in U.S. Pat. No. 3,798,750. All of the above patents are assigned to the same assignee as the present application.

Our present invention is directed to an improved miniaturized multifunctional probe which is suitable for biomedical, environmental control and other applications which probe can be used for in vivo or in vitro analyses.

The primary objects of our invention are to provide a rugged, accurate and miniaturized multifunctional probe for both pH and carbon dioxide measurements.

In accordance with one aspect of our invention, a miniature probe contains a carbon dioxide sensor and a pH electrode, or a carbon dioxide sensor and a pH sensor.

These and various other objects, features and advantages of the invention will be better understood from the following description taken in connection with the accompanying drawing in which:

The single FIGURE is a partial sectional view of a miniature probe containing a $CO_2$ sensor and a pH electrode made in accordance with our invention.

In the single FIGURE of the drawing there is shown generally at 10 a miniature multifunctional probe comprising a carbon dioxide sensor and a pH electrode made in accordance with our invention. The carbon dioxide sensor is shown in the form of flexible, elongated lead wire 11 which has a base member and an exterior surface 12 of a metal selected from the class consisting of palladium and irridium on the base member. An electrochemically active region 13 adheres tightly to and is in electrical contact with at least a portion of the metal surfaced base member 12 thereby forming a hydrogen ion-selective electrode. Electrochemically active region 13 is the respective oxide of the exterior surface metal. Other coatings, which show response to pH changes could also be used. A second lead 14 surrounds at least partially and is spaced from the metal surfaced base member 12. A second electrochemically active region 15 of silver and a silver halide is formed on lead 14 to provide a reference electrode. A layer of electrical insulation 16 is disposed between the metal surfaced base member 12 and lead 14. An electrolyte 17, which is preferably aqueous and immobilized, contacts both electrochemically active regions 13 and 15. An outer sheath 18 of carbon dioxide permeable, ion-impermeable diffusion barrier material encapsulates at least electrochemically active regions 13 and 15, and electrolyte 17. A second pH electrode 19 is shown in the form of a second separate portion of the metal surfaced base member 12 which is exposed exteriorly of outer sheath 18. A third electrochemically active region 20 adheres tightly to and is in electrical contact with the exposed portion of the metal surfaced base member. The third electrochemically active region is the respective oxide of the exterior surface metal. Region 20 is insulated electrically from regions 13 and 15 by electrical insulation 21 which is shown adhering to the metal surfaced base member between active regions 13 and 20 and forms also a tight bond with outer sheath 18.

The above improved carbon dixode sensor can be formed by a method of applying successive elements or layers by immersing or dipping the initial metal surfaced member in various organic solutions after which each solution solvent was evaporated. The application of the successive layers is preferably accomplished by immersion steps but other suitable means include coating, spraying, brushing, etc. The use of immersion steps is described and claimed in the above referenced U.S. Pat. No. 3,798,750.

The miniature probe of our invention can be formed by employing for the initial support wire a noble metal of palladium or iridium. The first electrochemically active region for the sensing electrode is the respective oxide of palladium or iridium. In the event that a metal base member other than palladium is employed, a layer of palladium or iridium must be deposited on at least a portion thereof. The second lead can be silver or gold. If gold is employed, silver is deposited on at least a portion thereof. The second electrochemically active region which is applied to lead 14 is a silver-silver halide except a fluoride.

Various electrical insulating materials are usable and many of such materials can be applied by coating steps. Preferred materials, include epoxy resins, Alkanex polyester resin lacquer, silicone rubbers, and polypropylene oxides. Alkanex polyester resin lacquer is preferred since it provides the desired electrical insulation and it can be applied by coating or dipping. The Alkanex polyester resin lacquer can be cross-linked by heating to insolubilize and thereby facilitate the application of successive layers. Various carbon dioxide diffusion barrier materials are suitable as an outer sheath to encapsulate at least the electrochemically active regions and the electrolyte. The carbon dioxide diffusion barrier material must be electrically insulating and have an appropriate permeability coefficient for the carbon dioxide to be sensed. Since these materials are electrically insulating, the carbon dioxide diffusion barrier sheath and the second layer of insulation can be made of one of these materials. Thus, the separate second layer of electrical insulation can be eliminated. Suitable materials include silicone-polycarbonate copolymers, Viton hexafluoropropylene-vinylidene fluoride rubber and silicon rubbers.

Our carbon dioxide sensor can be formed by applying successive elements from various organic solutions after which each solution solvent is evaporated. The application of the successive layers is preferably accomplished by a series of immersion or application coating steps.

With reference to the single FIGURE of the drawing, a carbon dioxide sensor is formed in accordance with our invention by employing a 20 mil palladium wire 11 as the base or support upon which the successive elements are applied. The wire has its central portion immersed in a solution of Alkanex polyester resin lacquer to apply a first layer of electrical insulation 16 on lead wire 11. It will be appreciated, of course, that a tube of insulation could be applied over the central portion of the current collector by slipping the tube over the collector. Opposite ends of wire 11 are exposed and not coated by insulation 16. Two electrochemically active regions 13 and 20 are formed in electrical contact with lead wire 11 by roughening two separate portions at one exposed end of the lead wire by sand blasting and then applying the respective oxide as described in the above U.S. Pat. Nos. 3,705,088 and 3,719,576. The opposite exposed end (not shown) is provided for subsequently applying an electrical lead thereto.

A second lead 14 is formed of silver or gold and is applied to surround lead wire 11 by painting or plating the silver or the gold thereon or a silver tube may be used. Second active region 15 at one end of the gold or silver is silver and silver chloride which silver chloride is applied by a chloriding step such as anodization in a chloride solution. If gold is employed, silver is deposited electrochemically and then silver chloride is formed on its surface. A second layer of electrical insulation can be applied over second lead 14 except for the chlorided region and for a small region at the upper end for subsequently applying an electrical lead thereto. However, it is preferred to employ the subsequently applied carbon dioxide diffusion barrier in this manner thereby eliminating the need for a separate electrically insulating coating on second lead 14. Electrochemically active regions 13 and 15 are coated with a solution of sodium bicarbonate and sodium chloride with a thickening agent thereby forming an electrolyte 17. Electrolyte 17 is in contact with both regions 13 and 15. A diffusion barrier of siliconepolycarbonate block copolymer such as described in U.S. Pat. No. 3,189,622 is then applied as an outer sheath 18 encapsulating the active regions 13 and 15, and electrolyte 17. Sheath 18 does not cover active region 20 which forms pH electrode 19. Electrode 19 is exposed exteriorly of outer sheath 18. While this sheath provides electrical insulation to insulate active region 20 from active regions 13 and 15, it is necessary to provide separate electrical insulation 21 which makes a tight bond to wire 11 between regions 13 and 20 for this purpose. The pH electrode is used with a second reference electrode such as a silver-silver halide electrode which surrounds and is insulated electrically from the first reference electrode, or which is spaced from the other elements of the device.

The electrolyte can be an aqueous solution, an aqueous immobilized solution, or an anion exchange resin electrolyte. A suitable aqueous electrolyte is 0.01 molar bicarbonate and 0.14 molar sodium chloride. This is particularly desirable since it is isotonic with blood. The aqueous electrolyte can be immobilized, for example, with a conventional thickening or gelling agent. Such aqueous electrolytes and applications are described in above-mentioned U.S. Pat. No. 3,719,576. Anion exchange resin electrolytes, preparations therefor, and applications are described in above-mentioned U.S. Pat. No. 3,705,088. Above U.S. Pat. Nos. 3,705,088, 3,719,576, 3,189,622 and 3,198,750 and the subject matter therein are hereby incorporated by reference.

The hydrogen ion-selective or pH electrode can also be in the form of a lead with other coatings which show response to pH changes. Either or both oxide regions 13 and 19 can be replaced with a layer of silver and silver halide except a fluoride on a metallic lead wire 11, an aqueous and immobilized electrolyte in contact therewith, and a hydrogen ion-permeable membrane. Alternately, the hydrogen ion-permeable membrane can be affixed directly to the oxide region on the lead. A suitable immobilized aqueous electrolyte is an aqueous electrolyte which is immobilized by a gelling agent, such as Methocell gelling agent. The electrolyte is provided by 0.15 M sodium chloride and a phosphate buffer containing 3.0% of such gelling agent. The hydrogen ion-permeable membrane can be of the type described and claimed in U.S. Pat. No. 3,743,588 which patent is assigned to the same assignee as the present application. This patent and its subject matter are hereby incorporated by reference. This membrane can be applied by an immersion step thereby encapsulating the electrolyte. The hydrogen ion-permeable membrane can also be applied directly by an immersion step thereby encapsulating the oxide region. The lead can be made of various electronically conductive metallic materials, such as, silver, copper, cadmium, palladium, etc. The lead had a superficially formed oxide or a deliberately formed oxide.

The resulting device is a miniature probe containing multifunctional electrochemical sensing elements. The carbon dioxide sensor, and the pH electrode of the miniature probe with a reference electrode can be used for clinical and other analysis. A high impedance electrometer 22 is connected to the electrodes of the probe and to a separate or second reference electrode 23. In this manner the terminal voltage can be read across the electrodes containing the first active region 13 and the second active material 15. This terminal voltage from the leads 11 and 14 in operation will be a function of the carbon dioxide partial pressure in equilibrium with it. The terminal voltage can also be read separately across lead 11 and second reference electrode 23. This terminal voltage from the sensor in operation will be a function of the pH.

Examples of miniature probes made in accordance with our invention are as follows:

EXAMPLE 1

A miniature probe sensor is formed in accordance with the above description and as generally shown in the single FIGURE of the drawing. The metal surfaced base member is in the form of a 20 mil palladium wire, one end of which has been coated with palladium oxide. This is accomplished by dipping that end of the wire in 50 weight percent sodium hydroxide in water, heating the wire to 800°C in air for 20 minutes, cooling the wire, rinsing it in distilled water, and drying in air before applying insulation.

The remainder of the metal surfaced base member, with the exception of about 1 centimeter at the opposite end, is coated with Alkanex polyester resin lacquer. This is accomplished by immersing in a solution of Alkanex polyester resin lacquer. The coated wire is heated at a temperature of 100°C to evaporate the solvent and then to 200°C to cross-link the coating. This coating step is repeated several times. Additional insulation is coated on the base member separating the palladium oxide into two regions. The second lead is silver which is applied as a lacquer over the first insulation. The lacquer employs Alkanex polyester resin lacquer as the binder for silver flake. Application is accomplished as above for the first insulation. Only one coat is applied. A 0.5 cm. wide band at the end of the silver coating adjacent to the first palladium oxide region is chlorided anodically at a current of 0.5 milliamperes using 0.1 NHCl bath with a platinum electrode serving as the counter electrode. The sequence of the chloriding is 2 minutes anoidic, 2 minutes cathodic and 10 minutes anodic.

After this second electrochemically active region is formed, the lower end of the structure excluding the second palladium oxide region has applied thereon an aqueous immobilized electrolyte of 0.01 molar sodium bicarbonate and 0.14 molar sodium chloride.

A second layer of electrical insulation is then applied over the second lead and over the electrolyte excluding the second palladium oxide portion by contacting the structure wire with a solution of silicone-polycarbonate resin in chloroform. The chloroform is removed by heating for 5 to 10 minutes in a nitrogen atmosphere at 50°C. The resulting polymer film is both a diffusion barrier and has electrical insulating properties. Thus, in addition to an insulting layer being formed over the reference electrode a carbon dioxide diffusion barrier also encapsulates both of the electrically active regions and the electrolyte. The resulting structure is a miniature probe made in accordance with our invention.

EXAMPLE 2

A miniature probe sensor is formed in accordance with the above description and as generally shown in the single FIGURE of the drawing. The metal surfaced base member is in the form of a 20 mil palladium wire, one end of which has been coated with palladium oxide. This is accomplished by dipping that end of the wire in 50 weight percent sodium hydroxide in water, heating the wire to 800°C in air for 20 minutes, cooling the wire, rinsing it in distilled water, and drying in air before applying insulation.

The remainder of the metal surfaced base member, with the exception of about 1 centimeter at the opposite end, is coated with Alkanex polyester resin lacquer. This is accomplished by immersing in a solution of Alkanex polyester resin lacquer. The coated wire is heated at a temperature of 100°C to evaporate the solvent and then to 200°C to cross-link the coating. This coating step is repeated several times. Additional insulation is coated on the base member separating the palladium oxide into two regions. The second lead is silver which is applied as a lacquer over the first insulation. The lacquer employs Alkanex polyester resin lacquer as the binder for silver flake. Application is accomplished as above for the first insulation. Only one coat is applied. A 0.5 cm. wide band at the end of the silver coating adjacent to the first palladium oxide region is chlorided anodically at a current of 0.5 milliamperes using 0.1 NHCl bath with a platinum electrode serving as the counter electrode. The sequence of the chloriding is 2 minutes anodic, 2 minutes cathodic and 10 minutes anodic.

After this second electrochemically action region is formed, the lower end of the structure excluding the second palladium oxide region has applied thereon an ion exchange resin electrolyte consisting of a quaternized polystyrene in the chloride form having an ion exchange capacity of about 1.4 milli-equivalents per gram. The electrolyte layer is applied by contacting the lower end of the structure with a solution of the resin in a mixture of chloroform-methanol to contact both electrochemically active regions. The structure is then heated in nitrogen at 50°C for 10 minutes to eliminate any residual solvents.

The electrolyte is converted to a partially bicarbonate form and partially chloride form by immersing the structure in an aqueous 0.1 M KCl-0.1 M KHCO$_3$ solution for about an hour. The structure is then rinsed briefly in water and dried for about 1 minute in flowing nitrogen gas at 50°C.

A second layer of electrical insulation is then applied over the second lead and over the electrolyte excluding the second palladium oxide portion by contacting the structure wire with a solution of silicone-polycarbonate resin in chloroform. The chloroform is removed by heating for 5 to 10 minutes in a nitrogen atmosphere at 50°C. The resulting polymer film is both a diffusion barrier and has electrical insulating properties. Thus, in addition to an insulating layer being formed over the reference electrode a carbon dioxide diffusion barrier also encapsulates both of the electrically active regions and the electrolyte. The resulting structure is a miniature probe made in accordance with our invention.

While other modifications of the invention and variations thereof which may be embraced within the scope of the invention have not been described, the invention is intended to include such as may be embraced within the following claims.

What we claim as new and desire to secure by Letters Patent of the United States is:

1. A miniature probe comprising a carbon dioxide sensor and a pH electrode, the carbon dioxide sensor comprising a flexible, elongated first electrode wire, a first electrochemically active material adhering tightly to and in electrical contact with at least a portion of the first electrode lead wire, the first electrochemically active material responsive to changes in pH, a second electrode lead surrounding at least partially and spaced from the first electrode lead wire, a second electrochemically active region of silver and a silver halide except fluoride on a portion of the second electrode lead, a layer of electrical insulating disposed between the first electrode lead wire and the second electrode lead, an electrolyte contacting both electrochemically active materials, and an outer sheath of carbon dioxide permeable, ion-impermeable diffusion barrier material encapsulating at least the electrochemically active regions and the electrolyte; and a second pH electrode comprising a separate second portion of the first electrode lead wire which is exposed exteriorly of the outer sheath for contact with a sample to be tested for carbon dioxide content and hydrogen ion activity, a third electrochemically active region adhering tightly to and in electrical contact with the exposed portion of the first electrode lead wire, the third electrochemically active material responsive to changes in pH, and the third electrochemically active region insulated electrically from the second electrochemically active region.

2. A miniature probe as in claim 1, in which the first electrode lead wire comprises a base member, an exterior surface of a metal selected from the class consisting of palladium and iridium on the base member, and the first electrochemically active material is the respective oxide of the exterior surface metal.

3. A miniature probe as is claim 1, in which the outer sheath is a silicone-polycarbonate block copolymer.

4. A miniature probe as in claim 1, in which the electrolyte is an immobilized aqueous solution.

5. A miniature probe as in claim 1, in which the electrolyte is an anion exchange resin material of quaternized polystyrene partially in its bicarbonate form and partially in its chloride form.

6. A miniature sensor device comprising a carbon dioxide sensor and a pH sensor, the carbon dioxide sensor comprising a flexible, elongated first electrode lead wire, a first electrochemically active material adhering tightly to and in electrical contact with at least a portion of the first electrode lead wire, the first electrochemically active material responsive to changes in pH, a second electrode lead surrounding at least partially and spaced from the first electrode lead wire, a second electrochemically active region of silver and a silver halide except fluoride on a portion of the second electrode lead, a layer of electrical insulation disposed between the first electrode lead wire and the second electrode lead, an electrolyte contacting both electrochemically active materials, and an outer sheath of carbon dioxide permeable, ion-impermeable diffusion barrier material encapsulating at least the electrochemically active regions and the electrolyte; and a pH sensor comprising a separate second portion of the first electrode lead wire which is exposed exteriorly of the outer sheath for contact with a sample to be tested for carbon dioxide content and hydrogen ion activity, a third electrochemically active region adhering tightly to and in electrical contact with the exposed portion of the first electrode lead wire, the third electrochemically active material responsive to changes in pH, the third elelctrochemically active region insulated electrically from the second electrochemically active region, and a second reference electrode having an electrochemically active portion in insulating spaced relationship to and adapted for electrolytic connection to the third electrochemically active region.

7. A miniature probe as in claim 6, in which the first electrode lead wire comprises a base member, an exterior surface of a metal selected from the class consisting of palladium and iridium on the base member, and the first electrochemically active material is the respective oxide of the exterior surface metal.

8. A miniature sensor device as in claim 6, in which the second reference electrode is of silver-silver halide except fluoride and is spaced from the other elements of the device.

\* \* \* \* \*